(12) United States Patent
Kaneko et al.

(10) Patent No.: US 9,491,331 B2
(45) Date of Patent: Nov. 8, 2016

(54) IMAGE PROCESSING METHOD, IMAGE PROCESSING DEVICE, AND PROGRAM FOR RESTORING SPECTRAL CHARACTERISTICS OF AN OBJECT AND AN ILLUMINATION, RESPECTIVELY

(71) Applicant: NEC Corporation, Tokyo (JP)

(72) Inventors: Eiji Kaneko, Tokyo (JP); Masato Tsukada, Tokyo (JP); Gaku Nakano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/369,298

(22) PCT Filed: Dec. 13, 2012

(86) PCT No.: PCT/JP2012/082417
§ 371 (c)(1),
(2) Date: Jun. 27, 2014

(87) PCT Pub. No.: WO2013/099644
PCT Pub. Date: Jul. 4, 2013

(65) Prior Publication Data
US 2015/0207959 A1 Jul. 23, 2015

(30) Foreign Application Priority Data

Dec. 28, 2011 (JP) ................................. 2011-288886

(51) Int. Cl.
*G06K 9/00* (2006.01)
*H04N 1/60* (2006.01)
*H04N 9/67* (2006.01)
*H04N 17/00* (2006.01)
*H04N 17/02* (2006.01)
*H04N 9/73* (2006.01)
*H04N 9/04* (2006.01)

(52) U.S. Cl.
CPC .............. *H04N 1/6086* (2013.01); *H04N 1/60* (2013.01); *H04N 1/603* (2013.01); *H04N 1/6088* (2013.01); *H04N 9/67* (2013.01); *H04N 9/73* (2013.01); *H04N 17/002* (2013.01); *H04N 17/02* (2013.01); *H04N 9/045* (2013.01)

(58) Field of Classification Search
None
See application file for complete search history.

(56) References Cited

U.S. PATENT DOCUMENTS 4,648,051 A * 3/1987 Wandell .................... G01J 3/46
356/402
6,304,294 B1 * 10/2001 Tao .......................... H04N 9/73
348/370

(Continued)

FOREIGN PATENT DOCUMENTS

EP     1 906 674 A1    4/2008
JP     07-066986 A     3/1995

(Continued)

OTHER PUBLICATIONS

International Search Report corresponding to PCT/JP2012/082417 dated Mar. 12, 2013 (5 pages).

*Primary Examiner* — Feng Niu
(74) *Attorney, Agent, or Firm* — Wilmer Cutler Pickering Hale and Dorr LLP

(57) ABSTRACT

The present invention is a spectral image processing method including the steps of selecting observed spectral information from a multispectral image of a scene, generating a constraint on a spectral distribution of an illumination and a constraint on a surface reflectance of an object using a basis vector of the illumination and a basis vector of the surface reflectance, generating an observation equation that takes as parameters a weight coefficient of the basis vector of the illumination and a weight coefficient of the basis vector of the surface reflectance using the observed spectral information, the constraint on the spectral distribution of the illumination, and the constraint on the surface reflectance of the object, and calculating the spectral distribution of the illumination and the surface reflectance of the object of the scene from the observation equation.

11 Claims, 11 Drawing Sheets

(56) References Cited

U.S. PATENT DOCUMENTS

2009/0141976 A1 6/2009 Tsukada
2010/0328740 A1 12/2010 Tsukada
2012/0183213 A1* 7/2012 Robles-
 Kelly ................ G06K 9/00362
 382/165

FOREIGN PATENT DOCUMENTS

| JP | 2003-209856 A | 7/2003 |
| JP | 2009-175926 A | 8/2009 |
| WO | WO-2007-007786 A1 | 1/2007 |
| WO | WO-2007/007788 A1 | 1/2007 |
| WO | WO-2009/104787 A1 | 8/2009 |

* cited by examiner

IMAGE PROCESSING METHOD, IMAGE PROCESSING DEVICE, AND PROGRAM FOR RESTORING SPECTRAL CHARACTERISTICS OF AN OBJECT AND AN ILLUMINATION, RESPECTIVELY

CROSS-REFERENCE TO RELATED APPLICATIONS

This application is a national stage application of International Application No. PCT/JP2012/082417 entitled "Spectral Image Processing Method, Spectral Image Processing Device, and Program," filed on Dec. 13, 2012, which claims the benefit of the priority of Japanese Patent Application No. 2011-288886, filed on Dec. 28, 2011, the disclosures of each of which are hereby incorporated by reference in their entirety.

TECHNICAL FIELD

The present invention relates to a spectral image processing method, a spectral image processing device, and a program.

BACKGROUND ART

Color information of an image captured by an imaging apparatus is generated based on light entered into the imaging apparatus, the light being the environmental illumination light reflected by the surface of an object at the time of capturing the image. Therefore, when someone captures images of different objects each having the same surface reflectance under the different environmental illumination light, the color information of the captured images of the objects also vary. In such a technique that the object in a captured scene is recognized with the aid of a shape of the observed spectrum using a multispectral image in which light of multiple wavelengths is recorded, it becomes hard to identify the object if the observed spectrum varies according to a change of the environmental illumination light even in the same object. To solve the above problem, it is essential to obtain a surface reflectance of the object from the observed spectrum after eliminating the influence of the environmental illumination light from the observed spectrum. In other words, it is required to separate the spectral characteristic of the illumination and the spectral characteristic of the object from the observed spectrum to restore them.

There is a method for automatically estimating a spectral distribution of an illumination and a surface reflectance of an object in a captured scene with the aid of color information observed from the scene of, for example, an image. As an example of the method, such a method has been proposed that, on the assumption about an object color or an illumination color in the scene, the spectral characteristics of the illumination and the object are estimated with the aid of the assumption.

For example, in a method disclosed in Patent Literature 1, it is assumed that environmental illumination light is white, an average value of a reflectance is gray, and a visual characteristic of a person naturally supplies a color based on information around an edge area. In this method, each of the spectral distribution of the illumination and the surface reflectance of the object is represented by the linear sum of the preliminary stored principal component vector and mean vector, and energy to be required for satisfying the assumption is defined to be optimized. This ensures estimation of the spectral distribution of the illumination and the surface reflectance of the object.

Further, in a method disclosed in Patent Literature 2, on the assumption that a wide area is occupied by a skin-color object or a gray-color object in a captured image, an illumination range is corresponded to points on a black body locus, and, while changing the color temperature thereof, the energy required for satisfying the assumption is calculated and optimized, thereby estimating the color temperature. The color temperature estimated by the method ensures the estimation of illumination.

A schematic diagram of a method for estimating the illumination/reflectance using the above related art is shown in FIG. 11. The schematic diagram of FIG. 11 is a block diagram generated based on Patent Literature 1 and Patent Literature 2. Each of the above related art includes a color information acquiring means 1, an illumination/reflectance principal component vector storage memory 2, and a spectrum estimating means 3.

The color information acquiring means 1 acquires color information from a scene to output the acquired color information. The illumination/reflectance principal component vector storage memory 2 stores a principal component vector and a mean vector in order to represent constraints on a spectral distribution of an illumination and a surface reflectance of an object. The spectrum estimating means 3 calculates energy necessary for satisfying the assumption about an object color or an illumination color set in advance while each of the spectral distribution of the illumination and the surface reflectance of the object is represented by a linear sum of the respective principal component vector and mean vector using color information and optimizes the calculated energy. Further, the spectrum estimating means 3 outputs as estimated values the spectral distribution of the illumination and the surface reflectance of the object when the calculated energy becomes optimum.

CITATION LIST

Patent Literature

[Patent Literature 1]
Japanese Unexamined Patent Application, First Publication No. Hei 07-066986
[Patent Literature 2]
Japanese Unexamined Patent Application, First Publication No. 2003-209856

SUMMARY OF INVENTION

Technical Problem

It is an ill-posed problem to separate an illumination color and an object color in a scene from color information observed as an image and to restore the spectral characteristic of each of the illumination color and the object color. To solve the problem, in the conventional art, an assumption about the object color or the illumination color in the scene is set, thereby restoring a spectral distribution of the illumination and a surface reflectance of the object. This ensures accurate estimation of the spectral distribution of the illumination and the surface reflectance of the object with respect to the specific scene that satisfies the assumption set forth above. However, there was a problem that, with respect to a scene that does not satisfy the assumption, the estimation accuracy of the spectral characteristics of the illumination and the object became deteriorated.

The present invention was made to solve the above problem. Therefore, the purpose of the present invention is to provide a spectral image processing method for accurately restore spectral characteristics of an object and an illumination from an observed spectrum without the aid of an assumption about an object color and an illumination color in a scene, a spectral image processing device, and a program.

Solution to Problem

The present invention is directed to a spectral image processing method including the steps of selecting observed spectral information from a multispectral image of a scene, generating a constraint on a spectral distribution of an illumination and a constraint on a surface reflectance of an object using a basis vector of the illumination and a basis vector of the surface reflectance, generating an observation equation that takes as parameters a weight coefficient of the basis vector of the illumination and a weight coefficient of the basis vector of the surface reflectance using the observed spectral information, the constraint on the spectral distribution of the illumination, and the constraint on the surface reflectance of the object, and calculating the spectral distribution of the illumination and the surface reflectance of the object of the scene from the observation equation.

The present invention is directed to a spectral image processing device including a spectral information selecting means configured to select observed spectral information from a multispectral image of a scene, a constraint generating means configured to generate a constraint on a spectral distribution of an illumination and a constraint on a surface reflectance of an object using a basis vector of the illumination and a basis vector of the surface reflectance, an observation equation generating means configured to generate an observation equation that takes as parameters a weight coefficient of the basis vector of the illumination and a weight coefficient of the basis vector of the surface reflectance using the observed spectral information, the constraint on the spectral distribution of the illumination, and the constraint on the surface reflectance of the object, and a calculation means configured to calculate the spectral distribution of the illumination and the surface reflectance of the object of the scene from the observation equation.

The present invention is directed to a program causing a computer to execute selection of observed spectral information from a multispectral image of a scene, generation of a constraint on a spectral distribution of an illumination and a constraint on a surface reflectance of an object using a basis vector of the illumination and a basis vector of the surface reflectance, generation of an observation equation that takes as parameters a weight coefficient of the basis vector of the illumination and a weight coefficient of the basis vector of the surface reflectance using the observed spectral information, the constraint on the spectral distribution of the illumination, and the constraint on the surface reflectance of the object, and calculation of the spectral distribution of the illumination and the surface reflectance of the object of the scene from the observation equation.

Advantageous Effect of Invention

The present invention is capable of stably accurately estimating a spectral distribution of an illumination and a surface reflectance of an object with the aid of acquired optical spectrum information independently from an observed scene.

DESCRIPTION OF EMBODIMENTS

The present invention relates to a spectral image processing technique for estimating spectral characteristics of an illumination and an object in a scene with the aid of color information observed from the scene. More specifically, the present invention relates to the spectral image processing technique for estimating a spectral distribution of the illumination and a surface reflectance of the object, without resorting to the assumption about an object color or an illumination color in the scene, using the optical spectrum observed by a camera having a high wavelength resolution.

Now, detailed descriptions of the embodiments of the present invention will be made by referring to the accompanying drawings.

First Embodiment

Figure 1:
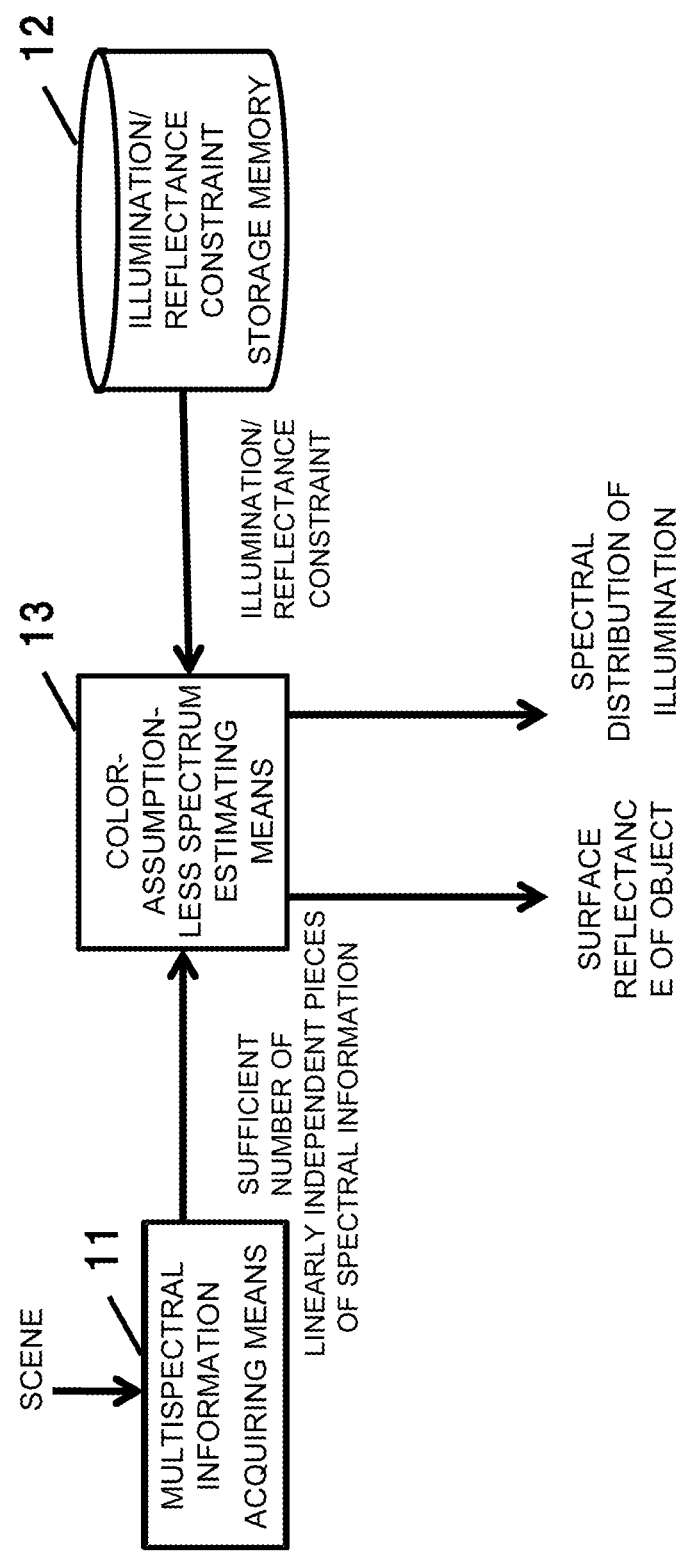
FIG. 1 is a schematic diagram schematically illustrating a first embodiment according to the present invention.

FIG. 1 is a block diagram schematically illustrating a first embodiment according to the present invention. The first embodiment illustrated in FIG. 1 includes a multispectral information acquiring means 11, an illumination/reflectance constraint storage memory 12, and a color-assumption-less spectrum estimating means 13.

Each means constituting the first embodiment according to the present invention will be summarized below.

The multispectral information acquiring means 11 extracts the number of pieces of spectral information sufficient for optimization based on multispectral information acquired from a scene to output the extracted spectral information.

The illumination/reflectance constraint storage memory 12 stores constraints on a spectral distribution of an illumination and a surface reflectance of an object.

The color-assumption-less spectrum estimating means 13 generates an observation equation in a manner to satisfy the constraints on the spectral distribution of the illumination and the surface reflectance of the object, that are stored in the illumination/reflectance constraint storage memory 12, based on the number of pieces of spectral information sufficient for optimization, the information having been calculated by the multispectral information acquiring means 11. Then, the color-assumption-less spectrum estimating means 13 solves the observation equation to obtain the spectral distribution of the illumination and the surface reflectance of the object. Finally, the color-assumption-less spectrum estimating means 13 outputs the obtained spectral distribution of the illumination and surface reflectance of the object.

A configuration of the first embodiment according to the present invention differs from the configuration of the above related art in the multispectral information acquiring means 11, the illumination/reflectance constraint storage memory 12, and the color-assumption-less spectrum estimating means 13. Hereinafter, configurations of the multispectral information acquiring means 11, the illumination/reflectance constraint storage memory 12, and the color-assumption-less spectrum estimating means 13 will be described in detail.

Figure 11:
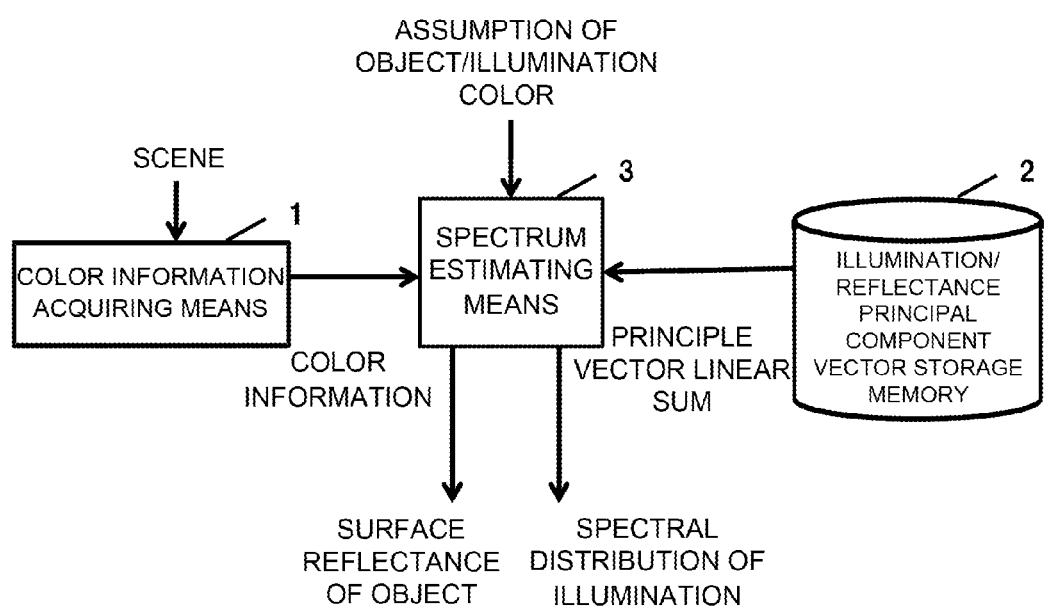
FIG. 11 is a schematic diagram illustrating a method for estimating illumination/reflectance according to a related art.

The multispectral information acquiring means 11 acquires the multispectral information from the scene in a manner similar to the color information acquiring means 1 in FIG. 11. The multispectral information acquiring means 11 differs from the color information acquiring means 1 in the following point. The color information acquiring means 1 ignores the number of pieces of color information to be output. To the contrary, in consideration of the processing to be performed later by the color-assumption-less spectrum estimating means 13, the multispectral information acquiring means 11 outputs the number of pieces of spectral information required for optimization. Here, provided that N represents the number of bands of an observed optical spectrum, M represents the number of observed optical spectrums, $P_{all}$ represents a total number of parameters to be estimated, $P_I$ represents the number of parameters required for reproducing a spectral distribution of a single illumination, and $P_R$ represents the number of parameters required for reproducing a surface reflectance of a single object, the multispectral information acquiring means 11 outputs, for example, the number of linearly independent pieces of spectral information sufficient for satisfying an equation (1).

[Equation 1]

$$N \times M \geq P_{all} \quad (1)$$

$P_{all} = P_I + M \times P_R$ (when illumination of scene is same)
N: number of bands of observed optical spectrum
M: number of observed optical spectrums
$P_{all}$: total number of parameters to be estimated
$P_I$: [number of parameters required for reproducing single illumination]
$P_R$: [number of parameters required for reproducing single object]

Figure 2:
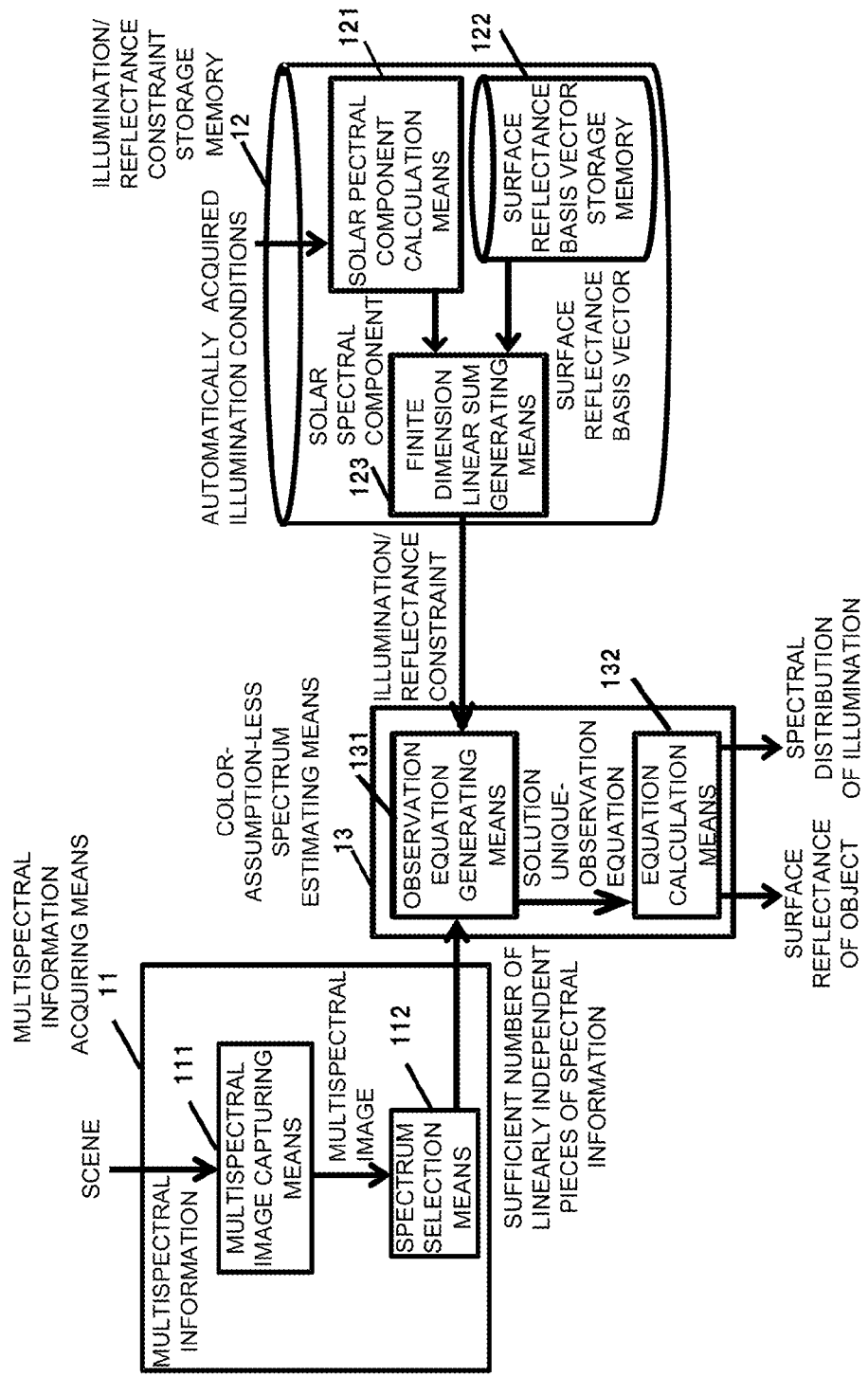
FIG. 2 is a schematic diagram illustrating the first embodiment according to the present invention.

FIG. 2 is a block diagram illustrating the first embodiment according to the present invention. FIG. 2 illustrates an interior configuration of the multispectral information acquiring means 11. The multispectral information acquiring means 11 of FIG. 2 includes a multispectral image capturing means 111 and a spectrum selection means 112.

The multispectral image capturing means 111 outputs a multispectral image in which the multispectral information of the scene is recorded.

The spectrum selection means 112 selects, for example, a plurality of pieces of spectral information that are linearly independent from one another and satisfying conditions of the equation (1) from data of the multispectral images acquired by the multispectral image capturing means 111 to output the selected spectral information.

A spectrum estimating means 3 of FIG. 11 estimates the spectral distribution of the illumination and the surface reflectance of the object in the scene based on an assumption about preliminary set object color or illumination color. More specifically, the spectrum estimating means 3 defines energy required for satisfying the assumption about the set object color or illumination color and performs optimization thereof to estimate the spectral distribution of the illumination and the surface reflectance of the object in the scene. For example, the spectrum estimating means 3 calculates the energy required for satisfying the following assumption. The exemplary assumptions are "an averaged object color is gray" (Gray World Assumption), "the brightest object in the image is white", "a skin color is included in the image", and "an illumination is white". The spectrum estimating means 3 outputs as estimated values the spectral distribution of the illumination and the surface reflectance of the object when the calculated energy becomes optimum.

To the contrary, the color-assumption-less spectrum estimating means 13 in the first embodiment calculates the spectral distribution of the illumination and the surface reflectance of the object without the aid of the assumption about the object color or the illumination color. Here, the color-assumption-less spectrum estimating means 13 accurately estimates the spectral distribution of the illumination and the surface reflectance of the object using the constraints on the spectral distribution of the illumination and the surface reflectance of the object. For estimating these spectral characteristics, the color-assumption-less spectrum estimating means 13 generates an observation equation based on the number of linearly independent pieces of spectral information sufficient for satisfying the equation (1) and model formulas of the spectral distribution of the illumination and the surface reflectance of the object. Then, the color-assumption-less spectrum estimating means 13 solves the generated observation equation to output the spectral distribution of the illumination and the surface reflectance of the object as estimated values.

An interior configuration of the color-assumption-less spectrum estimating means 13 will be described below. The color-assumption-less spectrum estimating means 13 of FIG. 2 includes an observation equation generating means 131 and an equation calculation means 132.

The observation equation generating means 131 generates models of a spectral distribution I of the illumination and a surface reflectance R of the object, that are vectors of N dimensions, in a manner represented by an equation (2) using variable weight coefficients $a_{pI}$ and $b_{pR}$ with respect to a basis vector $I_{pI}^{basis}$ of the spectral distribution of the illumination and a basis vector $R_{pR}^{basis}$ of the surface reflectance of the object, respectively. When the wavelength components $I_{pI}^{basis}(\lambda_n)$ and $R_{pR}^{basis}(\lambda_n)$ of the basis vectors in the model equation (2) and the number of linearly independent pieces of spectral information $E_m(\lambda_n)$ (m=1, . . . , M, n=1, . . . , N) sufficient for optimization satisfying the equation (1) are given, the observation equation generating means 131 generates an observation equation such as an equation (3). Because the number of equations becomes equal to or more than unknowns from the conditions of the equation (1) and the observation equation is constituted by the linearly independent spectral information, optimum solutions of a spectral distribution I ($\lambda_n$) of the illumination and a surface reflectance R ($\lambda_n$) of the object will be obtainable.

[Equation 2]

$$I = \sum_{p_I=1}^{P_I} a_{p_I} I_{p_I}^{basis},$$

$$R = \sum_{p_R=1}^{P_R} b_{p_R} R_{p_R}^{basis}$$

$$(p_I = 1, \ldots, P_I, p_R = 1, \ldots, P_R)$$

(2)

I, R: vectors of N dimensions representing spectral distribution of illumination and surface reflectance of object $I_{p_I}^{basis}$, $R_{p_R}^{basis}$: basis vectors of spectral distribution of illumination and surface reflectance of object $a_{p_I}$, $b_{p_R}$: weight coefficients of basis vectors of spectral distribution of illumination and surface reflectance of object $P_I$, $P_R$: number of bases of spectral distribution of illumination and surface reflectance of object

[Equation 3]

$$E_m(\lambda_n) = \sum_{p_I=1}^{P_I} a_{p_I} I_{p_I}^{basis}(\lambda_n) \sum_{p_R=1}^{P_R} b_{p_R,m} R_{p_R}^{basis}(\lambda_n)$$

$$(n = 1, \ldots, N, m = 1, \ldots, M)$$

(3)

The equation calculation means 132 solves the observation equation represented by the equation (3).

Figure 8:
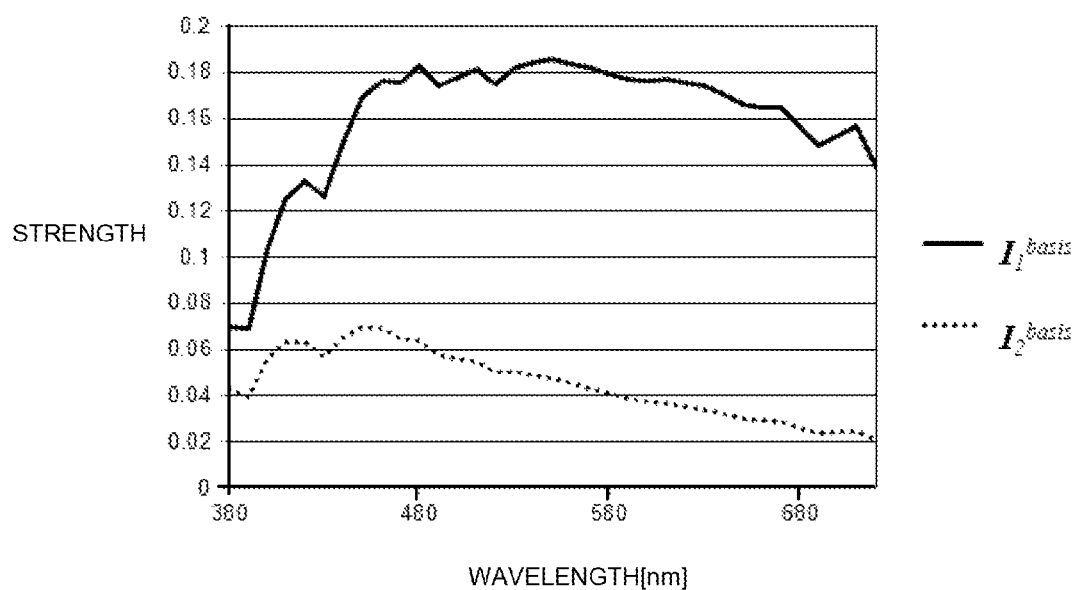
FIG. 8 illustrates exemplary basis vectors of a spectral distribution of an illumination.
Figure 9:
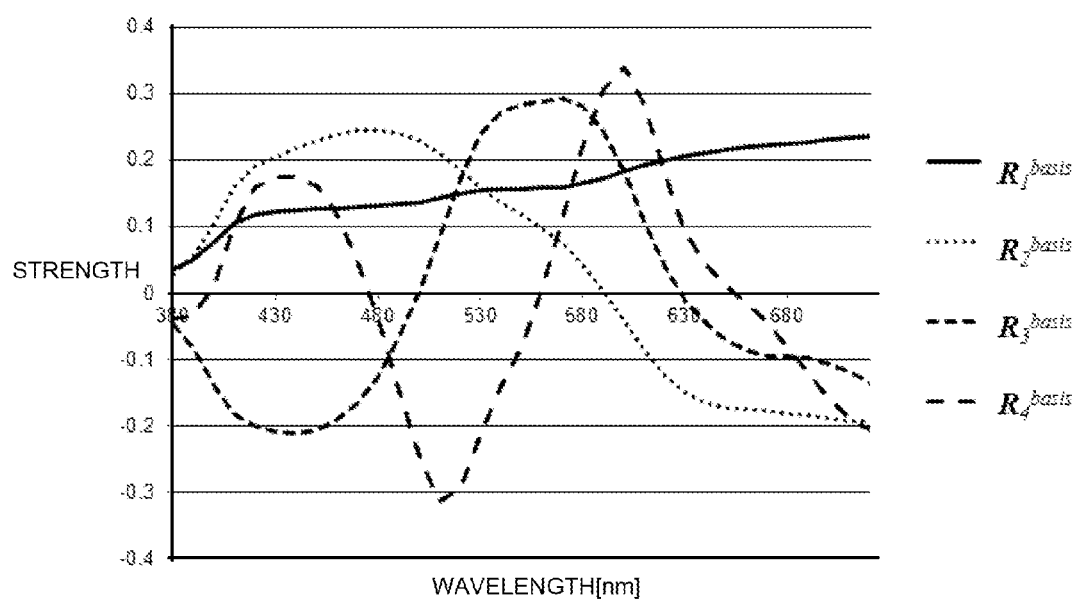
FIG. 9 illustrates exemplary basis vectors of a surface reflectance generated from direct-current components and principal component vectors of 24 colors of the Macbeth color chart.

An illumination/reflectance constraint storage memory 12 of the first embodiment stores the basis vectors of the spectral distribution of the illumination and the surface reflectance of the object and outputs, using these basis vectors, the spectral distribution of the illumination and the surface reflectance of the object distributing in a range constrained by various constraining methods. For example, in a case of the spectral distribution of the illumination, as shown in FIG. 8, a directly transmitted component $I_1^{basis}$ and a scattering component $I_2^{basis}$ that are components of a solar spectrum calculated from a solar radiation model may be used for the basis vectors. The solar radiation model is capable of constraining a distribution range of the spectral distribution of the illumination according to readily acquirable illumination conditions such as date and place. A mean vector and a principal component vector of a relative spectral distribution of the natural daylight in the CIE daylight illuminant disclosed in a Non-patent Literature 1 (New Handbook of Color Science Vol. 2 pp. 69-72) may be used for the basis vectors of the spectral distribution of the illumination. A coefficient of the principal component vector is capable of being calculated based on a relative color temperature by constraining the number of principal component vectors or using a method disclosed in the Non-patent Literature 1. This ensures constraining of the distribution range of the spectral distribution of the illumination. In the case of the surface reflectance of the object, the mean vector and the principal component vector in a reflectance database of the object measured as an object to be captured may be used for the basis vectors. The constraining of the number of the principal component vectors enables constraining of the distribution range of the reflectance of the object. For example, the mean vector and the principal component vector that are generated from the Macbeth color chart illustrated in FIG. 9 may be used for the basis vectors.

An interior configuration of the illumination/reflectance constraint storage memory 12 will be described below. The illumination/reflectance constraint storage memory 12 shown in FIG. 2 includes a solar spectral component calculation means 121, a surface reflectance basis vector storage memory 122, and a finite dimension linear sum generating means 123.

The solar spectral component calculation means 121 calculates, for example, solar spectral components using the solar radiation model and stores each component as $P_I$-plex (<N) basis vectors $I_{p_I}^{basis}$ ($p_I=1, \ldots, P_I$).

The surface reflectance basis vector storage memory 122 stores $P_R$-plex (<N) basis vectors $R_{p_R}^{basis}$ ($p_R=1, \ldots, P_R$) of the surface reflectance of the object.

The finite dimension linear sum generating means 123 takes a linear sum according to the equation (2) using variable weight coefficients $a_{p_I}$, $b_{p_R}$ with respect to the solar spectral component $I_{p_I}^{basis}$ stored as the basis vector of the spectral distribution of the illumination and the basis vector $R_{p_R}^{basis}$ of the surface reflectance of the object, respectively, and thereby generates the spectral distribution I of the illumination and the surface reflectance R of the object as the N-dimensional vectors.

Figure 10:
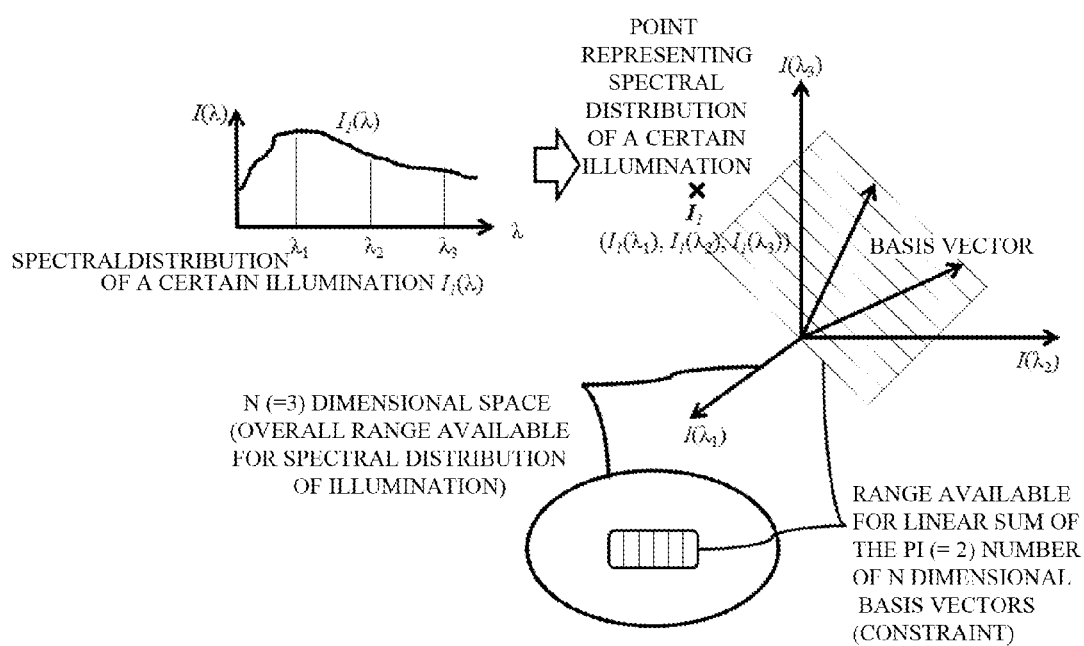
FIG. 10 illustrates an image of a constraint on the spectral distribution of the illumination.

FIG. 10 illustrates an image of the constraint on the spectral distribution of the illumination. For example, when N is 3 and $P_I$ is 2, as shown in FIG. 10, in a distribution space available for the spectral distribution of the illumination where strength of each wavelength of the spectral distribution of the illumination is set to a coordinate value of each dimension and a spectral distribution of a single illumination is represented by a single point on the coordinates, the spectral distribution of the illumination represented as the linear sum of the basis vectors is shown in a plane.

In other words, a range available for the spectral distribution of the illumination is constrained. Similarly, by generating the spectral distribution I of the illumination and the surface reflectance R of the object according to a method of the equation (2), ranges available for the spectral distribution I of the illumination and the surface reflectance R of the object in the N-dimensional space will also be constrained. In this manner, the constraints on the spectral distribution I of the illumination and the surface reflectance R of the object are calculated.

Figure 3:
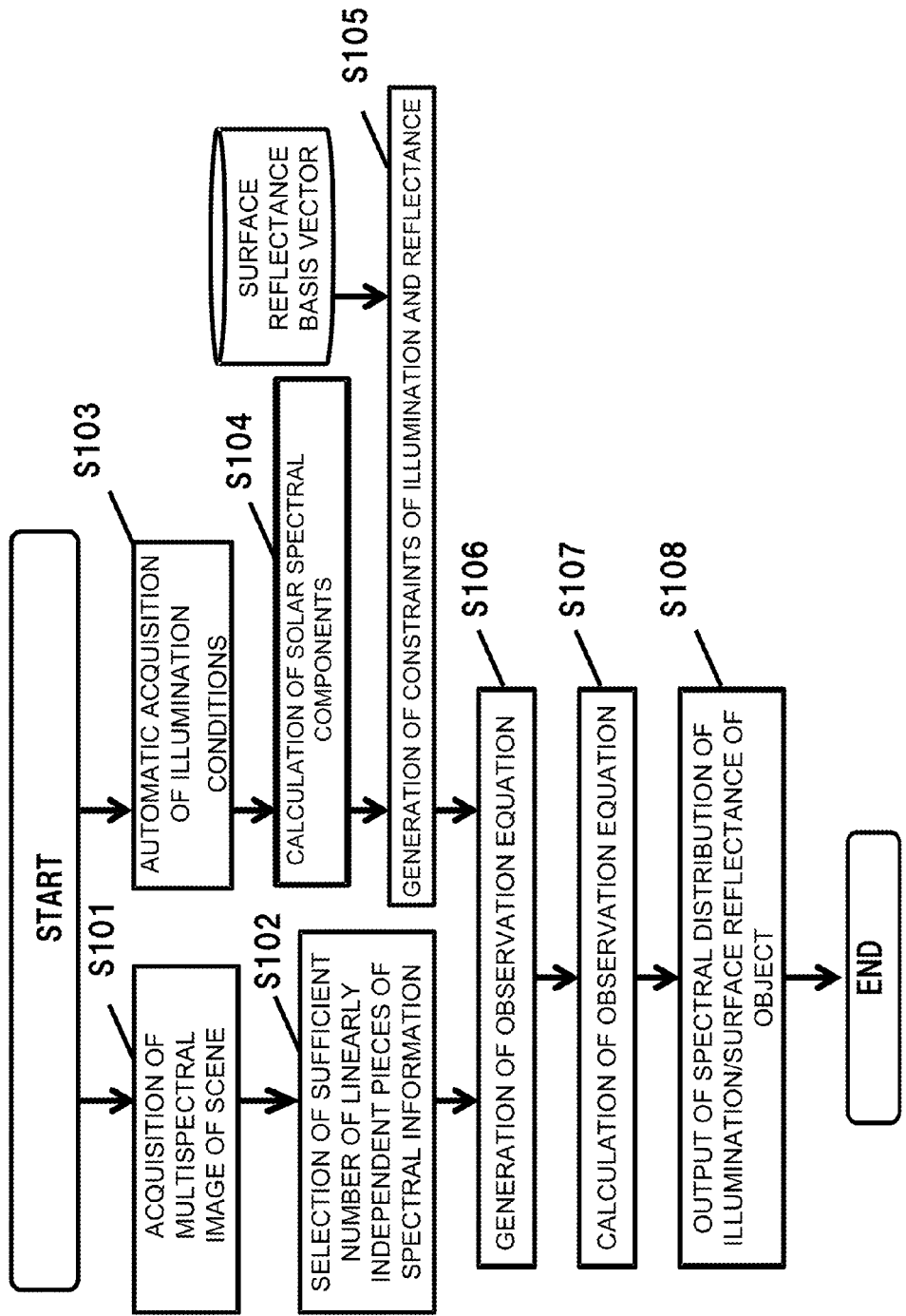
FIG. 3 is a flow chart illustrating the first embodiment according to the present invention.

FIG. 3 is a flow chart illustrating operations of the spectral image processing method in the first embodiment for carrying out the present invention.

The multispectral image capturing means 111 acquires multispectral information from a scene to output a multispectral image (step S101).

The spectrum selection means 112 selects a spectrum from the multispectral image and outputs sufficient number of linearly independent pieces of spectral information (step S102).

The solar spectral component calculation means 121 automatically acquires automatically acquirable illumination conditions (step S103).

The solar spectral component calculation means 121 calculates the solar spectral components and outputs the calculated solar spectral components (step S104).

A finite dimensional linear sum generation means 123 generates the constraints on the spectral distribution of the illumination and the surface reflectance of the object based on the solar spectral components and the basis vector of the surface reflectance stored in the surface reflectance basis vector storage memory 122 (step S105).

The observation equation generating means 131 generates an observation equation capable of obtaining an optimum solution using the sufficient number of linearly independent pieces of spectral information and constraints on the spectral distribution of the illumination and the surface reflectance of the object (step S106).

The equation calculation means 132 solves the observation equation capable of obtaining the optimum solution to output the surface reflectance of the object and the spectral distribution of the illumination (step S107 and S108).

In the first embodiment, the multispectral information acquiring means 11 acquires the sufficient number of linearly independent pieces of spectral information from the scene and obtains the constraints on the spectral distribution of the illumination and the surface reflectance of the object stored in the illumination/reflectance constraint storage memory 12. This ensures the color-assumption-less spectrum estimating means 13 to estimate the spectral distribution of the illumination and the surface reflectance of the object without the aid of the assumption about the object color and the illumination color. Therefore, regardless of whether the scene satisfies a specific assumption, it becomes possible to stably accurately estimate the spectral distribution of the illumination and the surface reflectance of the object.

In the spectral image processing method in the first embodiment, the solar spectral component calculation means 121 calculates the solar spectral components, which ensures the output of a narrow constraint in the illumination. Obtainment of the narrow constraint in the illumination decreases the number of parameters to be estimated. This ensures the observation equation generating means 131 to generate an observation equation for easy calculation. As a result, the equation calculation means 132 is capable of outputting the surface reflectance of the object and the spectral distribution of the illumination that are highly accurately estimated.

Second Embodiment

Figure 4:
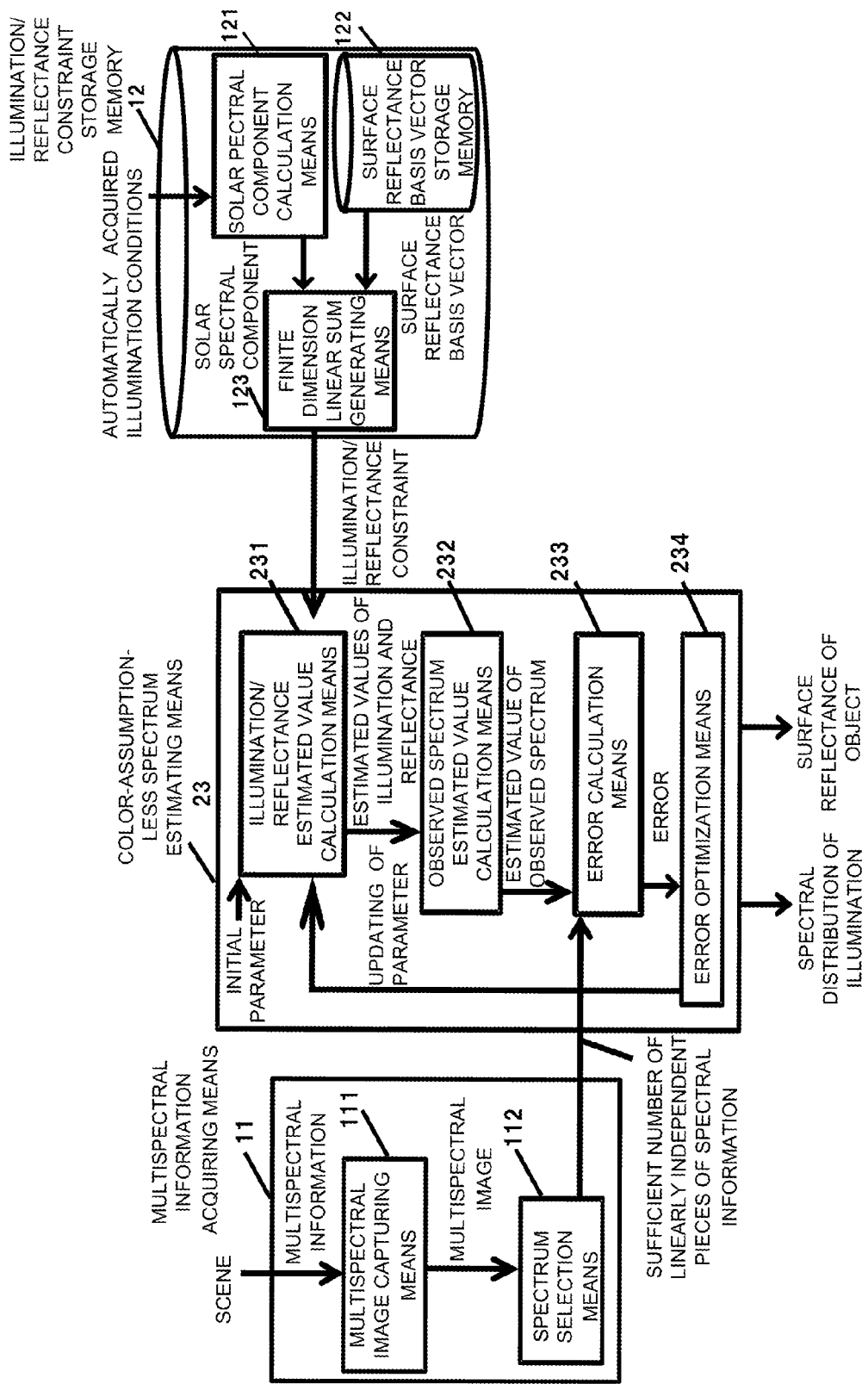
FIG. 4 is a schematic diagram illustrating a second embodiment according to the present invention.

FIG. 4 is a block diagram illustrating a second embodiment for carrying out the present invention. As shown in FIG. 4, a spectral image processing method of the second embodiment for carrying out the present invention includes components identical to those of the first embodiment except that a color-assumption-less spectrum estimating means 23 differs from the color-assumption-less spectrum estimating means 13 in the first embodiment. The components identical to those of the first embodiment are given same reference numerals in FIG. 2, with detailed description being omitted.

In the second embodiment, the color-assumption-less spectrum estimating means 23 includes an illumination/reflectance estimated value calculation means 231, an observed spectrum estimated value calculation means 232, an error calculation means 233, and an error optimization means 234.

The illumination/reflectance estimated value calculation means 231 calculates estimated values of the spectral characteristics of the illumination and the surface reflectance of the object by giving initial parameters to weight coefficients of the spectral distribution of the illumination and the surface reflectance of the object under the constraints on the spectral distribution I ($\lambda_n$) of the illumination and the surface reflectance R ($\lambda_n$) of the object of the equation (2).

The estimated observed spectrum estimated value calculating means 232 calculates an estimated value of the observed spectrum by substitution of the estimated values of the spectral characteristics of the illumination and the surface reflectance of the object into the right side of the equation (3), the estimated values being calculated by the illumination/reflectance estimated value calculation means 231.

The error calculation means 233 calculates, in the light of an error of the observation equation (3), an error using the observed spectrum estimated value (the right side of the equation (3)) calculated by the observed spectrum estimated value calculation means 232 and observed values $E_m$ ($\lambda_n$) obtained from a plurality of multispectrums given as the number of pieces of color information sufficient for optimization. Provided that the spectral distribution of the illumination, the surface reflectance of the object, and the measuring error of the observed spectrum are represented by $\epsilon_I(\lambda_n)$, $\epsilon_R(\lambda_n)$, and $\epsilon_L(\lambda_n)$, respectively, the observation equation (3) may be represented by an equation (4). To optimize those measuring errors, i.e., to obtain approximate values of those measuring errors, for example, there is such a method that the minimum square error energy as represented by an equation (5) is defined and the defined energy is then minimized.

[Formula 4]

$$E_m(\lambda_n) = \left( \sum_{P_I=1}^{P_I} a_{P_I} I_{P_I}^{basis}(\lambda_n) + \epsilon_I(\lambda_n) \right) \left( \sum_{P_R=1}^{P_R} b_{P_R,m} R_{P_R}^{basis}(\lambda_n) + \epsilon_R(\lambda_n) \right) + \epsilon_E(\lambda_n) \quad (4)$$

$(n = 1, \ldots, N, m = 1, \ldots, M)$

[Formula 5]

$$\sum_{m=1}^{M} \sum_{n=1}^{N} \left( E_m(\lambda_n) - \sum_{P_I=1}^{P_I} a_{P_I} I_{P_I}^{basis}(\lambda_n) \sum_{P_R=1}^{P_R} b_{P_R,m} R_{P_R}^{basis}(\lambda_n) \right)^2 \quad (5)$$

The error optimization means 234 optimizes the error calculated by the error calculation means 233 using the non-linear optimization method such as the Levenberg-Marquardt Method and the coarse-to-fine search method. More specifically, to minimize the error, the parameters given to the illumination/reflectance estimated value calculation means 231 are repeatedly updated, and the illumination/reflectance estimated value calculation means 231 finally outputs the surface reflectance of the object and the spectral distribution of the illumination calculated from the optimum parameter as the optimum solution.

The color-assumption-less spectrum estimating means 13 outputs the estimated values of the spectral distribution of the illumination and the surface reflectance of the object calculated by the error optimization means 234.

Figure 5:
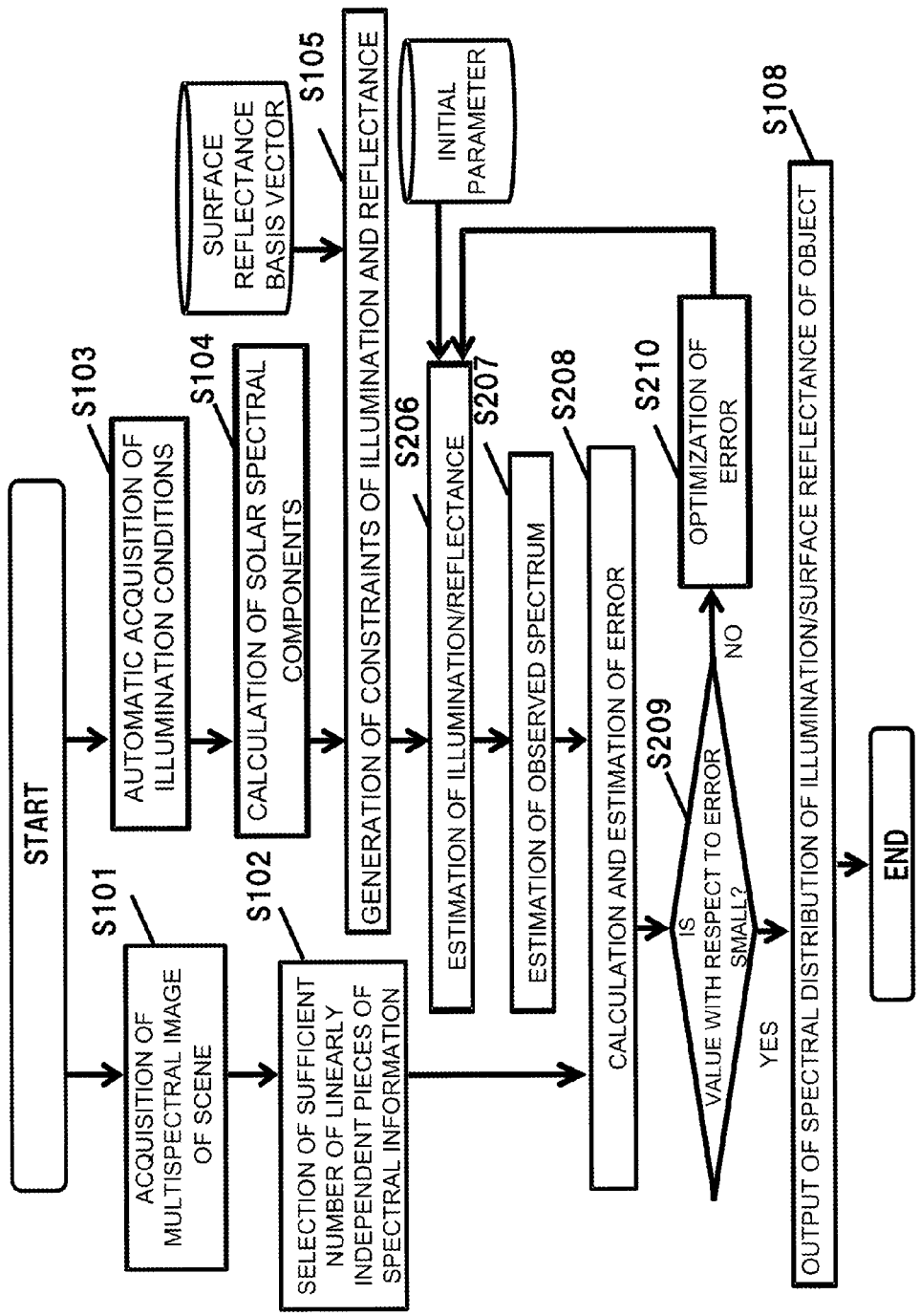
FIG. 5 is a flow chart illustrating the second embodiment according to the present invention.

FIG. 5 is a flow chart illustrating exemplary operations of the spectral image processing method in the second embodiment for carrying out the present invention. The operations identical to those of the first embodiment are given same reference numerals of FIG. 3, with detailed description being omitted.

The second embodiment differs from the first embodiment in the following points.

The illumination/reflectance estimated value calculation means 231 calculates estimated values of the spectral distribution of the illumination and the surface reflectance of the object based on the initial parameters and the constraints on the spectral distribution of the illumination and the surface reflectance of the object (step S206).

The observed spectrum estimated value calculation means 232 calculates an estimated value of the observed spectrum based on the estimated values of the spectral distribution of the illumination and the surface reflectance of the object (step S207).

The error calculation means 233 calculates the estimated value of the observed spectrum and an error of the observed sufficient number of linearly independent pieces of spectral information (step S208).

The error optimization means 234 calculates a set value for each error optimization means using the error. Then, if the calculated value is smaller than a preliminary set value, the operation thereof advances to step S108, and if not smaller, the operation thereof advances to step S210 (step S209).

The error optimization means 234 updates the parameters to be given to the illumination/reflectance estimated value calculation means 231 in order to minimize the error, and returns to step S206 (step S210).

Third Embodiment

Figure 6:
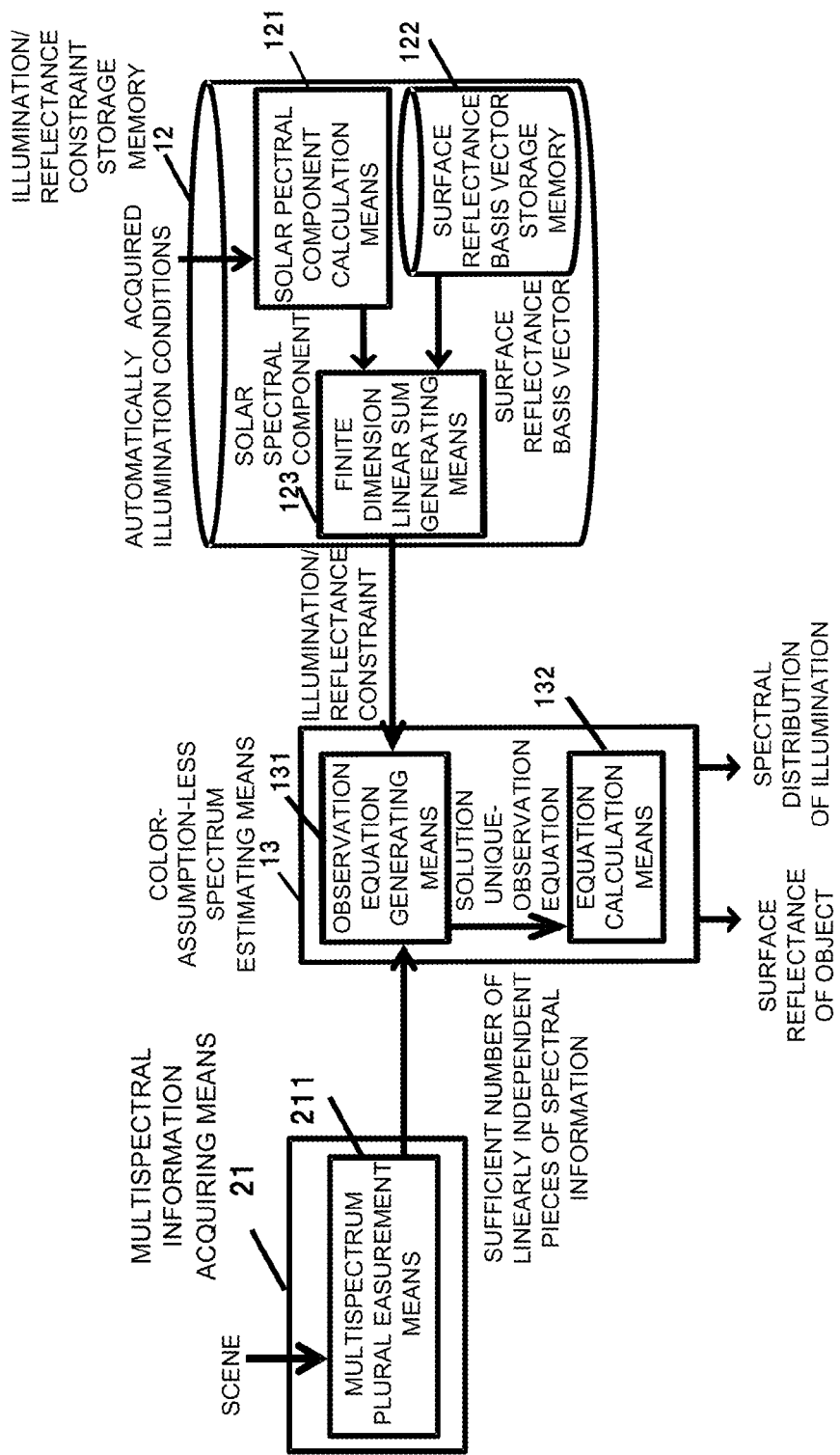
FIG. 6 is a schematic diagram illustrating a third embodiment according to the present invention.

FIG. 6 is a block diagram illustrating a third embodiment for carrying out the present invention. As shown in FIG. 6, a spectral image processing method in the third embodiment for carrying out the present invention includes components identical to those of the first embodiment except that a multispectral information acquiring means 21 differs from the multispectral information acquiring means 11 of the first embodiment. The components identical to those of the first embodiment are given same reference numerals of FIG. 2, with repeated description being omitted.

In the third embodiment, the multispectral information acquiring means 21 includes a multispectrum plural measurement means 211.

The multispectrum plural measurement means 211 captures different scenes until the linearly independent spectral information comes to be the sufficient number capable of satisfying the conditions of the equation (1), as far as the illumination colors can be considered as the same, in order to treat a case where there is not the sufficient number of linearly independent pieces of spectral information in the observed scene. Then, the multispectrum plural measurement means 211 outputs a plurality of pieces of spectral information that are sufficient for the latter optimization and in a linearly independent relationship.

More specifically, the multispectrum plural measurement means 211 is capable of being used, for example, in capturing an average scene in which no sufficient linearly-independent observed spectrum exists in the scene, to repeat capturing of the scenes (including capturing of moving images) until the sufficient linearly-independent observed spectrum is capable of being obtained.

Figure 7:
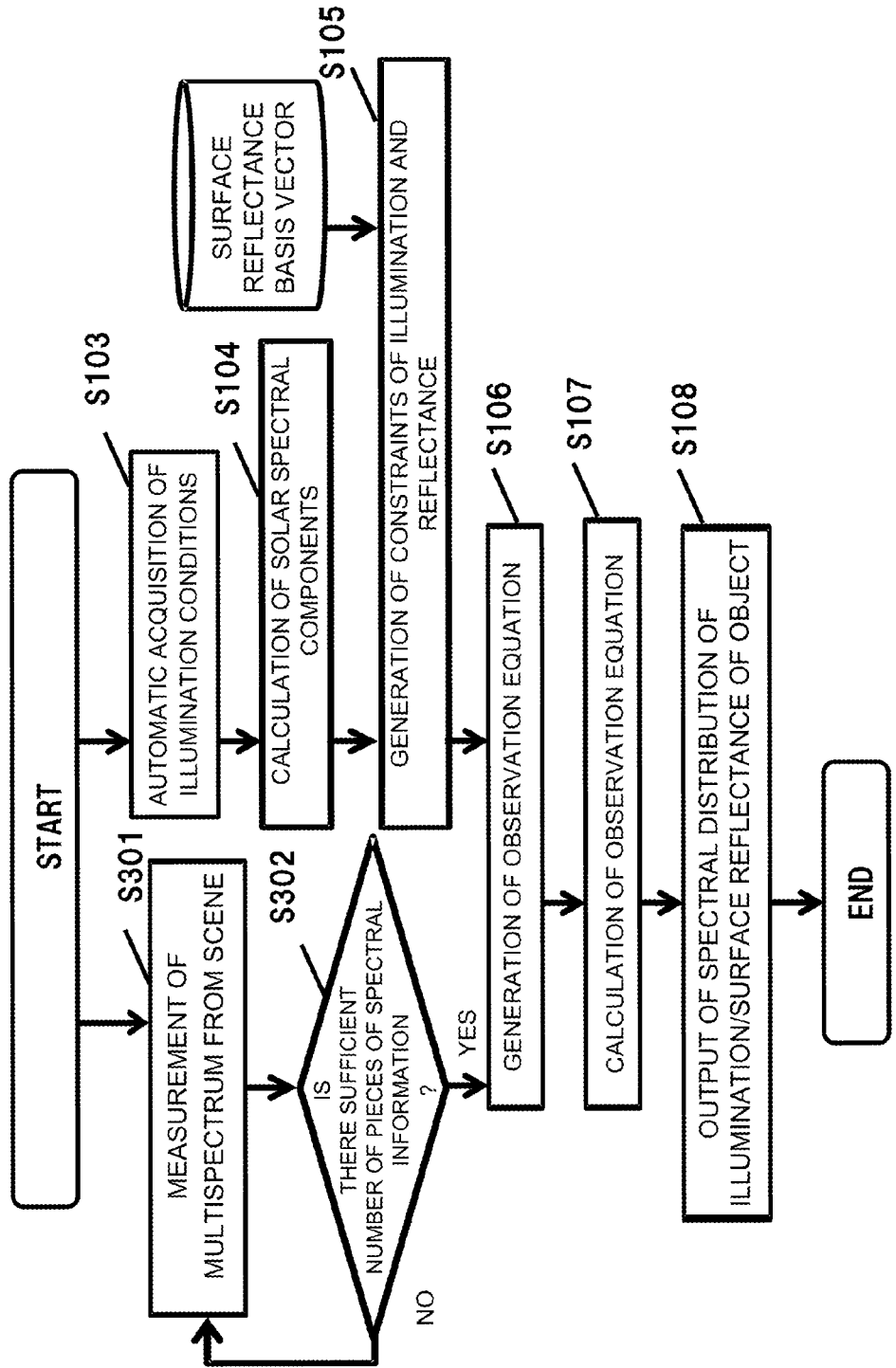
FIG. 7 is a flow chart illustrating the third embodiment according to the present invention.

FIG. 7 is a flow chart illustrating exemplary operations of the spectral image processing method in the third embodiment for carrying out the present invention. The operations identical to those of the first embodiment are given reference numerals identical to those in FIG. 3, with repeated description being omitted.

The third embodiment differs from the first embodiment in the following points.

The multispectrum plural measurement means 211 measures the multispectral information from the scene (step S301).

If the multispectral information measured from the scene is the sufficient number of linearly independent pieces of multispectral information, the multispectrum plural measurement means 211 advances its operation to step S106, whereas, if not, the multispectrum plural measurement means 211 returns its operation to step S301 (step S302).

According to the spectral image processing method in the third embodiment, the multispectrum plural measurement means 211 captures different scenes until the number of linearly independent pieces of spectral information sufficient for satisfying the conditions of the equation (1) is acquired. This ensures acquisition of the sufficient number of linearly independent pieces of spectral information even if the observed scenes do not include the sufficient number of linearly independent pieces of spectral information.

As apparent from the above description, it is possible to constitute each unit by hardware. Alternatively, it is possible to achieve a function of each unit by a computer program. In this case, a processor operating on a program in a program memory realizes the functions and the operations as described in the above embodiments. It is also possible to cause the computer program to realize the functions of the above embodiments only partially.

Further, the above embodiments may be partially or entirely described similarly to, but not limited to, the following supplementary notes.

Supplementary Note 1

A spectral image processing method including:

selecting observed spectral information from a multispectral image of a scene;

generating a constraint on a spectral distribution of an illumination and a constraint on a surface reflectance of an object using a basis vector of the illumination and a basis vector of the surface reflectance;

generating an observation equation including as parameters a weight coefficient of the basis vector of the illumination and a weight coefficient of the basis vector of the surface reflectance using the observed spectral information, the constraint on the spectral distribution of the illumination, and the constraint on the surface reflectance of the object; and calculating the spectral distribution of the illumination and the surface reflectance of the object of the scene from the observation equation.

Supplementary Note 2

The spectral image processing method according to supplementary note 1, further including:

calculating an estimated value of the observed spectrum by giving an initial parameter to the weight coefficient of the observation equation under the constraint on the spectral distribution of the illumination and the constraint on the surface reflectance of the object;

updating the weight coefficient based on the observed spectral information and an error of the estimated value of the observed spectrum; and calculating the spectral distribution of the illumination and the surface reflectance of the object constituting the estimated value of the observed spectrum, when the error is within a predetermined range, as the spectral distribution of the illumination and the surface reflectance of the object in the scene.

Supplementary Note 3

The spectral image processing method according to supplementary note 1 or 2, further including:
selecting linearly independent spectral information from the multispectral image as the observed spectral information.

Supplementary Note 4

The spectral image processing method according to any one of supplementary notes 1 to 3, wherein a directly transmitted component vector and a scattering component vector of a solar spectrum are used as basis vectors of the illumination.

Supplementary Note 5

The spectral image processing method according to supplementary note 3 or 4, wherein a plurality of measurements are performed until the linearly independent spectral information is capable of being observed for the number equal to or more than the sum of the number of weight coefficients of the basis vectors of the illumination and the number of weight coefficients of the basis vectors of the surface reflectance.

Supplementary Note 6

A spectral image processing device including:
a spectral information selecting means configured to select observed spectral information from a multispectral image of a scene;
a constraint generating means configured to generate a constraint on a spectral distribution of an illumination and a constraint on a surface reflectance of an object using a basis vector of the illumination and a basis vector of the surface reflectance;
an observation equation generating means configured to generate an observation equation including as parameters a weight coefficient of the basis vector of the illumination and a weight coefficient of the basis vector of the surface reflectance using the observed spectral information, the constraint on the spectral distribution of the illumination, and the constraint on the surface reflectance of the object; and
a calculation means configured to calculate the spectral distribution of the illumination and the surface reflectance of the object of the scene from the observation equation.

Supplementary Note 7

The spectral image processing device according to supplementary note 6, wherein the calculation means includes:
a means configured to calculate an estimated value of the observed spectrum by giving an initial parameter to the weight coefficient of the observation equation under the constraint on the spectral distribution of the illumination and the constraint on the surface reflectance of the object;
a means configured to update the weight coefficient based on the observed spectral information and an error of the estimated value of the observed spectrum; and
a means configured to calculate the spectral distribution of the illumination and the surface reflectance of the object constituting the estimated value of the observed spectrum, when the error is within a predetermined range, as the spectral distribution of the illumination and the surface reflectance of the object in the scene.

Supplementary Note 8

The spectral image processing device according to supplementary note 6 or 7, wherein the spectral information selecting means is configured to select linearly independent spectral information from the multispectral image.

Supplementary Note 9

The spectral image processing device according to any one of supplementary notes 6 to 8, wherein the spectral information selecting means is configured to use a directly transmitted component vector and a scattering component vector of a solar spectrum as basis vectors of the illumination.

Supplementary Note 10

The spectral image processing device according to supplementary note 8 or 9, wherein the spectral information selecting means is configured to perform a plurality of measurements until the linearly independent spectral information is capable of being observed for the number equal to or more than the sum of the number of weight coefficients of the basis vectors of the illumination and the number of weight coefficients of the basis vectors of the surface reflectance.

Supplementary Note 11

A program for causing a computer to execute:
selection of observed spectral information from a multispectral image of a scene;
generation of a constraint on a spectral distribution of an illumination and a constraint on a surface reflectance of an object using a basis vector of the illumination and a basis vector of the surface reflectance;
generation of an observation equation including as parameters a weight coefficient of the basis vector of the illumination and a weight coefficient of the basis vector of the surface reflectance using the observed spectral information, the constraint on the spectral distribution of the illumination, and the constraint on the surface reflectance of the object; and
calculation of the spectral distribution of the illumination and the surface reflectance of the object of the scene from the observation equation.

Each embodiment as described above is a mere preferable embodiment of the present invention and thus the present invention will not be limited only to the embodiment. It is possible to carry out the present invention with various changes and modifications without departing from the spirit and scope of the invention.

This application claims the benefit of Japanese Patent Application No. 2011-288886, filed Dec. 28, 2011, the disclosure of which is hereby incorporated by reference.

REFERENCE SIGNS LIST 1 color information acquiring means
2 spectrum estimating means 3 illumination/reflectance principal component vector storage memory
11 multispectral information acquiring means
12 color-assumption-less spectrum estimating means
13 illumination/reflectance constraint storage memory
21 multispectral information acquiring means
23 color-assumption-less spectrum estimating means
111 multispectral image capturing means
112 spectrum selection means
121 solar spectral component calculation means
122 surface reflectance basis vector storage memory
123 finite dimension linear sum generating means
131 observation equation generating means
132 equation calculation means
211 multispectrum plural measurement means
231 illumination/reflectance estimated value calculation means
232 observed spectrum estimated value calculation means
233 error calculation means
234 error optimization means

The invention claimed is:

1. A spectral image processing method executing on a processor comprising:
   selecting observed spectral information from a multispectral image of a scene;
   generating, in a memory, a constraint on a spectral distribution of an illumination and a constraint on a surface reflectance of an object using a basis vector of the illumination and a basis vector of the surface reflectance;
   generating an observation equation including as parameters a weight coefficient of the basis vector of the illumination and a weight coefficient of the basis vector of the surface reflectance using the observed spectral information, the constraint on the spectral distribution of the illumination, and the constraint on the surface reflectance of the object; and
   calculating the spectral distribution of the illumination and the surface reflectance of the object of the scene from the observation equation and
   wherein a directly transmitted component vector and a scattering component vector of a solar spectrum are used as basis vectors of the illumination.

2. The spectral image processing method according to claim 1, further comprising:
   calculating an estimated value of the observed spectrum by giving an initial parameter to the weight coefficient of the observation equation under the constraint on the spectral distribution of the illumination and the constraint on the surface reflectance of the object;
   updating the weight coefficient based on the observed spectral information and an error of the estimated value of the observed spectrum; and
   calculating the spectral distribution of the illumination and the surface reflectance of the object constituting the estimated value of the observed spectrum, when the error is in a predetermined range, as the spectral distribution of the illumination and the surface reflectance of the object in the scene.

3. The spectral image processing method according to claim 1, wherein linearly independent spectral information is selected from the multispectral image as the observed spectral information.

4. The spectral image processing method according to claim 3, wherein a plurality of measurements is performed until the linearly independent spectral information is capable of being observed for the number equal to or more than the sum of the number of weight coefficients of the basis vectors of the illumination and the number of weight coefficients of the basis vectors of the surface reflectance.

5. A spectral image processing device comprising:
   a spectral information selector configured to select observed spectral information from a multispectral image of a scene;
   a constraint generator configured to generate a constraint on a spectral distribution of an illumination and a constraint on a surface reflectance of an object using a basis vector of the illumination and a basis vector of the surface reflectance;
   an observation equation generator configured to generate an observation equation comprising as parameters a weight coefficient of the basis vector of the illumination and a weight coefficient of the basis vector of the surface reflectance using the observed spectral information, the constraint on the spectral distribution of the illumination, and the constraint on the surface reflectance of the object; and
   a calculator configured to calculate the spectral distribution of the illumination and the surface reflectance of the object of the scene from the observation equation and
   wherein the spectral information selector is configured to use a directly transmitted component vector and a scattering component vector of a solar spectrum as the basis vectors of the illumination.

6. The spectral image processing device according to claim 5, wherein the calculator comprises:
   a unit configured to calculate an estimated value of the observed spectrum by giving an initial parameter to the weight coefficient of the observation equation under the constraint on the spectral distribution of the illumination and the constraint on the surface reflectance of the object;
   a unit configured to update the weight coefficient based on the observed spectral information and an error of the estimated value of the observed spectrum; and
   a unit configured to calculate the spectral distribution of the illumination and the surface reflectance of the object constituting the estimated value of the observed spectrum, when the error is within a predetermined range, as the spectral distribution of the illumination and the surface reflectance of the object in the scene.

7. The spectral image processing device according to claim 5, wherein the spectral information selector is configured to select linearly independent spectral information from the multispectral image.

8. A non-transitory computer readable storage medium storing a program causing a computer to execute:
   selection of observed spectral information from a multispectral image of a scene;
   generation of a constraint on a spectral distribution of an illumination and a constraint on a surface reflectance of an object using a basis vector of the illumination and a basis vector of the surface reflectance;
   generation of an observation equation comprising as parameters a weight coefficient of the basis vector of the illumination and a weight coefficient of the basis vector of the surface reflectance using the observed spectral information, the constraint on the spectral distribution of the illumination, and the constraint on the surface reflectance of the object; and
   calculation of the spectral distribution of the illumination and the surface reflectance of the object of the scene from the observation equation and wherein a directly transmitted component vector and a scattering component vector of a solar spectrum are used as the basis vectors of the illumination.

9. A spectral image processing device comprising:

a memory that stores an illumination basis vector and a surface reflectance basis vector;

a processor configured to:

select observed spectral information from a multispectral image of a scene;

generate a constraint on a spectral distribution of an illumination and a constraint on a surface reflectance of an object in the scene using the illumination basis vector and the surface reflectance basis vector;

generate an observation equation with parameters comprising a weight coefficient of the illumination basis vector and a weight coefficient of the surface reflectance basis vector using the observed spectral information, the constraint on the spectral distribution of the illumination, and the constraint on the surface reflectance of the object; and calculate the spectral distribution of the illumination and the surface reflectance of the object in the scene from the generated observation equation and wherein the processor is configured to use a directly transmitted component vector and a scattering component vector of a solar spectrum as the basis vectors of the illumination.

10. The spectral image processing device according to claim 9, wherein the processor is further configured to:

calculate an estimated value of the observed spectrum by giving an initial parameter to the weight coefficient of the observation equation under the constraint on the spectral distribution of the illumination and the constraint on the surface reflectance of the object;

update the weight coefficient based on the observed spectral information and an error of the estimated value of the observed spectrum; and when the error is within a predetermined range, calculate the spectral distribution of the illumination and the surface reflectance of the object constituting the estimated value of the observed spectrum as the spectral distribution of the illumination and the surface reflectance of the object in the scene.

11. The spectral image processing device according to claim 9, wherein the processor is configured to select linearly independent spectral information from the multispectral image.

* * * * *